(12) United States Patent
Jung et al.

(10) Patent No.: US 10,501,624 B2
(45) Date of Patent: Dec. 10, 2019

(54) FLAME-RETARDANT POLYCARBONATE-POLYESTER COMPOSITIONS

(71) Applicant: Covestro Deutschland AG, Leverkusen (DE)

(72) Inventors: Mathieu Jung, Shanghai (CN); Ralf Hufen, Duisburg (DE); Thomas Eckel, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 70 days.

(21) Appl. No.: 15/736,136

(22) PCT Filed: Jun. 18, 2015

(86) PCT No.: PCT/EP2015/063769
§ 371 (c)(1),
(2) Date: Dec. 13, 2017

(87) PCT Pub. No.: WO2016/202399
PCT Pub. Date: Dec. 22, 2016

(65) Prior Publication Data
US 2019/0077953 A1 Mar. 14, 2019

(51) Int. Cl.
| | |
|---|---|
| *C08K 5/5399* | (2006.01) |
| *C08L 69/00* | (2006.01) |
| *C08L 67/02* | (2006.01) |
| *C08L 27/12* | (2006.01) |
| *C08L 51/04* | (2006.01) |
| *C08K 3/013* | (2018.01) |
| *B29C 51/00* | (2006.01) |
| *C08K 5/00* | (2006.01) |

(52) U.S. Cl.
CPC .......... *C08L 69/005* (2013.01); *C08K 5/5399* (2013.01); *C08L 27/12* (2013.01); *C08L 51/04* (2013.01); *C08L 67/02* (2013.01); *C08L 69/00* (2013.01); *B29C 51/002* (2013.01); *C08K 3/013* (2018.01); *C08K 5/005* (2013.01); *C08K 5/0075* (2013.01); *C08L 2201/02* (2013.01)

(58) Field of Classification Search
USPC ....................................................... 524/116
See application file for complete search history.

(56) References Cited

U.S. PATENT DOCUMENTS

| | | |
|---|---|---|
| 2,891,920 A | 6/1959 | Hyde et al. |
| 3,294,725 A | 12/1966 | Findlay et al. |
| 3,553,167 A | 1/1971 | Schnell et al. |
| 3,644,574 A | 2/1972 | Jackson, Jr. et al. |

(Continued)

FOREIGN PATENT DOCUMENTS

| | | |
|---|---|---|
| CA | 1173998 A | 9/1984 |
| DE | 961668 C | 4/1957 |

(Continued)

OTHER PUBLICATIONS

International Search Report for PCT/EP2015/063769 dated Feb. 26, 2016.

(Continued)

*Primary Examiner* — Terressa Boykin
(74) *Attorney, Agent, or Firm* — Drinker Biddle & Reath LLP

(57) ABSTRACT

Compositions comprising
A) at least one polymer selected from the group consisting of aromatic polycarbonate and aromatic polyestercarbonate,
B) at least one polyester, wherein the polyester is derived from succinic acid and optionally further dicarboxylic acids and aliphatic, cycloaliphatic, araliphatic diols or aromatic diols,
C) at least one cyclic phosphazene of structure (IV)

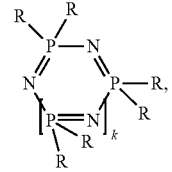

(IV)

wherein
R is in each case identical or different and represents
  an amine radical,
  in each case optionally halogenated $C_1$- to $C_8$-alkyl, $C_1$- to $C_8$-alkoxy
  in each case optionally alkyl- and/or halogen-substituted $C_5$- to $C_6$-cycloalkyl,
  in each case optionally alkyl- and/or halogen- and/or hydroxyl-substituted $C_6$- to $C_{20}$-aryloxy,
  in each case optionally alkyl- and/or halogen- and/or bromine-substituted $C_7$- to $C_{12}$-aralkyl,
  a halogen radical or
  an OH radical,
k is a whole number from 1 to 10
D) optionally graft polymer,
E) optionally vinyl (co)polymer and/or polyalkylene terephthalate,
F) optionally additives
and also the use of these flame-retarded polycarbonate/polyester compositions for producing molded articles and the molded articles themselves, wherein the polyester in the composition can be obtained or prepared preferably from renewable raw materials.

17 Claims, No Drawings

(56) References Cited

U.S. PATENT DOCUMENTS

| | | | |
|---|---|---|---|
| 3,692,744 A | 9/1972 | Rich et al. |
| 4,013,613 A | 3/1977 | Abolins et al. |
| 4,035,958 A | 7/1977 | Nishio |
| 4,075,173 A | 2/1978 | Maruyama et al. |
| 4,176,224 A | 11/1979 | Bier et al. |
| 4,269,964 A | 5/1981 | Freitag et al. |
| 4,311,823 A | 1/1982 | Imai et al. |
| 4,334,053 A | 6/1982 | Freitag et al. |
| 4,584,360 A | 4/1986 | Paul et al. |
| 4,806,593 A | 2/1989 | Kress et al. |
| 4,812,515 A | 3/1989 | Kress et al. |
| 4,859,740 A | 8/1989 | Damrath et al. |
| 4,861,831 A | 8/1989 | Damrath et al. |
| 4,888,388 A | 12/1989 | Hongo et al. |
| 4,937,285 A | 6/1990 | Wittmann et al. |
| 5,097,002 A | 3/1992 | Sakashita et al. |
| 5,340,905 A | 8/1994 | Kühling et al. |
| 5,717,057 A | 2/1998 | Sakashita et al. |
| 5,807,914 A | 9/1998 | Obayashi et al. |
| 6,093,759 A | 7/2000 | Gareiss et al. |
| 6,596,840 B1 | 7/2003 | Kratschmer et al. |
| 6,740,730 B1 | 5/2004 | Kratschmer et al. |
| 7,071,284 B2 | 7/2006 | Kauth et al. |
| 2009/0209695 A1 | 8/2009 | Yu et al. |
| 2011/0009531 A1 | 1/2011 | Aoshima et al. |
| 2013/0317142 A1 | 11/2013 | Chen et al. |
| 2015/0299463 A1 | 10/2015 | Jung et al. |
| 2016/0257794 A1 | 9/2016 | Grimm et al. |

FOREIGN PATENT DOCUMENTS

| | | |
|---|---|---|
| DE | 1900270 A1 | 11/1969 |
| DE | 2035390 A1 | 1/1971 |
| DE | 1495626 B1 | 6/1971 |
| DE | 2248242 A1 | 4/1973 |
| DE | 2232877 A1 | 1/1974 |
| DE | 2407674 A1 | 10/1974 |
| DE | 2407776 A1 | 9/1975 |
| DE | 2703376 A1 | 8/1977 |
| DE | 2714544 A1 | 10/1977 |
| DE | 2715932 A1 | 10/1978 |
| DE | 2842005 A1 | 4/1980 |
| DE | 3000610 A1 | 7/1980 |
| DE | 2940024 A1 | 4/1981 |
| DE | 3007934 A1 | 9/1981 |
| DE | 3334782 A1 | 10/1984 |
| DE | 3631539 A1 | 3/1988 |
| DE | 3631540 A1 | 3/1988 |
| DE | 3704655 A1 | 8/1988 |
| DE | 3704657 A1 | 8/1988 |
| DE | 3832396 A1 | 2/1990 |
| EP | 430134 A2 | 6/1991 |
| EP | 0707047 A2 | 4/1996 |
| EP | 0728811 A2 | 8/1996 |
| EP | 2706090 A1 | 3/2014 |
| GB | 776223 A | 6/1957 |
| GB | 1552558 A | 9/1979 |
| JP | H07324159 A | 12/1995 |
| JP | 2005008671 A | 1/2005 |
| JP | 2011016960 A | 1/2011 |
| WO | WO-9740092 A1 | 10/1997 |
| WO | WO-0105866 A1 | 1/2001 |
| WO | WO-0105867 A1 | 1/2001 |
| WO | WO-2004063249 A1 | 7/2004 |
| WO | WO-2014086832 A1 | 6/2014 |
| WO | WO-2015052114 A1 | 4/2015 |
| WO | WO-2015065611 A1 | 5/2015 |

OTHER PUBLICATIONS

Written Opinion of the International Searching Authority for PCT/EP2015/063769 dated Feb. 26, 2016.

FLAME-RETARDANT POLYCARBONATE-POLYESTER COMPOSITIONS

CROSS-REFERENCE TO RELATED APPLICATIONS

This application is a national stage application (under 35 U.S.C. § 371) of PCT/EP2015/063769, filed Jun. 18, 2015, which is incorporated herein by reference in its entirety.

The present invention relates to flame-retarded polycarbonate/polyester compositions having a high elongation at break and good chemicals resistance, wherein as flame retardants phosphazenes are employed and wherein the polyester is derived from succinic acid and optionally further dicarboxylic acids and aliphatic, cycloaliphatic, araliphatic or aromatic diols and also to the use of these flame-retarded polycarbonate/polyester compositions for producing molded articles and to the molded articles themselves.

BACKGROUND OF THE INVENTION

JP 7324159 A2 describes a polycarbonate composition comprising an aliphatic polyester which exhibits improved flowability while retaining mechanical properties. However, no details regarding chemicals stability are disclosed. Aliphatic polyesters recited include polyethylene succinate and polybutylene succinate but not polycarbonate compositions comprising polyesters of succinic acid and provided with phosphazenes as flame retardants.

JP 2011-016960 A describes a composition of polycarbonate, aliphatic polyester and an ethylene-glycidyl methacrylate copolymer and styrene polymer. A preferred aromatic polyester is specified as polybutylene succinate. The copolymer improves the toughness. However, there is no mention of improved chemicals resistance and elongation at break. Flame-retarded compositions are likewise not disclosed.

JP 2005-008671 A describes compositions of polycarbonate and aliphatic polyestercarbonates featuring good tear resistance and processability and also biodegradability. The polyestercarbonate is produced by a reaction of oligomeric butylene succinate with diphenyl carbonate. However, there is no mention of improved chemicals resistance. Flame-retarded compositions are likewise not disclosed.

US 2011/009531 A1 describes the production of aliphatic polyesters based on renewable raw materials and possible combination thereof with engineering plastics. However, there is no mention of improvements to chemicals resistance. Polycarbonate compositions comprising polyesters of succinic acid and provided with phosphazenes as flame retardants are likewise not disclosed.

US 2009/209695 A1 describes mixtures of polycarbonate, aliphatic polyesters and, optionally, polylactic acid. A particular polyester disclosed is polybutylene succinate. Good mechanical properties, flowability and heat distortion resistance are described. However, improved chemicals resistance is not mentioned. Polycarbonate compositions comprising polyesters of succinic acid and provided with phosphazenes as flame retardants are likewise not disclosed.

EP 0707047 A2 describes molded articles produced from branched and unbranched succinic acid polyesters. However, no compositions comprising polycarbonates as further thermoplastics, and also no details concerning elongation at break and chemicals resistance, are disclosed.

While plastics have increasingly replaced metals and wood in many areas of industry and of everyday life, and while there is intense work on the improvement in the properties of plastics and also on the opening-up of new territories for their application, a large part of these plastics is however based on raw materials that are not renewable, such as petroleum, the reserves of which are finite.

Recent years have therefore seen on the one hand the development of methods for the recycling of plastics, and on the other hand of plastics based on renewable raw materials, examples being polylactic acid (PLA) or polybutylene succinate (PBS).

The abovementioned documents also disclose compositions comprising plastics made of renewable raw materials and polycarbonate.

For certain applications these polycarbonate compositions need to be flame retarded and to exhibit increased resistance to chemicals. However the problem here is that mechanical properties are impaired by addition of flame retardants typically used for polycarbonate compositions.

BRIEF SUMMARY OF THE INVENTION

The present invention accordingly has for its object the provision of flame-retarded polycarbonate compositions comprising polyesters comprising succinic acid as a monomer unit (dicarboxylic acid) having a combination of increased elongation at break and excellent chemicals resistance.

It has now been found that, surprisingly, the compositions/molding materials comprising polycarbonate, polyesters comprising succinic acid as a monomer unit (dicarboxylic acid) and phosphazenes as flame retardants result in blends having the desired properties.

The compositions of the present invention comprise

A) at least one polymer selected from the group consisting of aromatic polycarbonate and aromatic polyestercarbonate, B) at least one polyester, wherein the polyester is derived from succinic acid and optionally further dicarboxylic acids and aliphatic, cycloaliphatic, araliphatic or aromatic diols, C) at least one cyclic phosphazene of structure (IV)

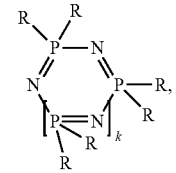

(IV)

wherein
R is in each case identical or different and represents
an amine radical,
in each case optionally halogenated $C_1$- to $C_8$-alkyl, $C_1$- to $C_8$-alkoxy
in each case optionally alkyl- and/or halogen-substituted $C_5$- to $C_6$-cycloalkyl,
in each case optionally alkyl- and/or halogen- and/or hydroxyl-substituted $C_6$- to $C_{20}$-aryloxy,
in each case optionally alkyl- and/or halogen- and/or bromine-substituted $C_7$- to $C_{12}$-aralkyl, a halogen radical or
an OH radical,
k is 1 or a whole number from 1 to 10,
D) optionally graft polymer,
E) optionally vinyl (co)polymer and/or polyalkylene terephthalate,
F) optionally additives.

DETAILED DESCRIPTION OF THE INVENTION

In a further embodiment the compositions comprise
A) 40 to 98 parts by weight, preferably 45 to 90 parts by weight, particularly preferably 50 to 85 parts by weight, of at least one polymer selected from the group consisting of aromatic polycarbonate and aromatic polyestercarbonate,
B) 1 to 60 parts by weight, preferably 3 to 50 parts by weight, more preferably 5 to 45 parts by weight, of polyester, wherein the polyester is derived from succinic acid and optionally further dicarboxylic acids and aliphatic, cycloaliphatic, araliphatic or aromatic diols,
C) 1 to 20 parts by weight, preferably 2 to 15 parts by weight, more preferably 3 to 12 parts by weight, of at least one cyclic phosphazene of structure (IV),

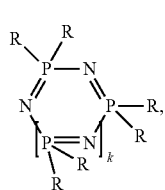
(IV)

wherein
k is 1 or a whole number from 1 to 10, preferably a number from 1 to 8, particularly preferably 1 to 5, with a trimer proportion (k=1) of 50 to 98 mol %, more preferably of 60 to 95 mol %, particularly preferably of 65 to 90 mol %, and very particularly preferably of 65-85 mol %, in particular 70-85 mol %, based on component C,
and wherein
R is in each case identical or different and represents an amine radical, in each case optionally halogenated, preferably fluorine-halogenated, $C_1$- to $C_8$-alkyl, preferably methyl, ethyl, propyl or butyl, $C_1$- to $C_8$-alkoxy, preferably methoxy, ethoxy, propoxy or butoxy, in each case optionally alkyl-, preferably $C_1$-$C_4$-alkyl-, and/or halogen-substituted, preferably chlorine-substituted and/or bromine-substituted, $C_5$- to $C_6$-cycloalkyl, in each case optionally alkyl-, preferably $C_1$-$C_4$-alkyl-, and/or halogen-substituted, preferably chlorine-, bromine- and/or hydroxyl-substituted, $C_6$- to $C_{20}$-aryloxy, preferably phenoxy, naphthyloxy, in each case optionally alkyl-, preferably $C_1$-$C_4$-alkyl-, and/or halogen-substituted, preferably chlorine- and/or bromine-substituted $C_7$- to $C_{12}$-aralkyl, preferably phenyl-$C_1$-$C_4$-alkyl, or a halogen radical, preferably chlorine, or an OH radical.
D) 0 to 20 parts by weight, preferably 0 to 15 parts by weight, particularly preferably 0 to 10 parts by weight, of graft polymer,
E) 0 to 20 parts by weight, preferably 0 to 15 parts by weight, particularly preferably 0 to 10 parts by weight, of vinyl (co)polymer and/or polyalkylene terephthalate,
F) 0 to 30 parts by weight, preferably 0.1 to 15.0 parts by weight, particularly preferably 0.2 to 10 parts by weight, of additives,
and wherein the sum of the parts by weight of the composition is normalized to 100.

In a further preferred embodiment the compositions consist only of components A-F.

The individual ranges of preference identified above for various components can be combined freely with one another, and with particular preference equivalent levels of retreat are combined with one another. In a further embodiment the composition is free from rubber-modified graft polymers.

In a further embodiment the composition is free from vinyl (co)polymers, in particular SAN (styrene-acrylonitrile) and polyalkylene terephthalates.

In a further embodiment the composition is free from vinyl (co)polymers and rubber-modified graft polymers.

The preferred embodiments of the present invention may be implemented individually or else interlinked with one another.

Preferred embodiments 1 to 28 of the present invention are described below:
1. Compositions characterized in that the proportions of the components are as follows
   A) 40 to 98 parts by weight
   B) 1 to 60 parts by weight
   C) 1 to 20 parts by weight
   D) 0 to 20 parts by weight
   E) 0 to 20 parts by weight
   F) 0 to 30 parts by weight
   and wherein the sum of the parts by weight of the composition is normalized to 100.
2. Compositions according to embodiment 1 characterized in that the proportions of the components are as follows
   A) 45 to 90 parts by weight
   B) 3 to 50 parts by weight
   C) 2 to 15 parts by weight
   D) 0 to 15 parts by weight
   E) 0 to 15 parts by weight
   F) 0.1 to 15.0 parts by weight
   and wherein the sum of the parts by weight of the composition is normalized to 100.
3. Compositions according to any of the preceding embodiments, characterized in that the proportions of the components are as follows
   A) 50 to 85 parts by weight
   B) 5 to 45 parts by weight
   C) 3 to 12 parts by weight
   D) 0 to 10 parts by weight
   E) 0 to 10 parts by weight
   F) 0.2 to 10 parts by weight
   and wherein the sum of the parts by weight of the composition is normalized to 100.
4. Compositions according to any of the preceding embodiments, characterized in that the polyester is derived from aliphatic or aromatic diols and as the dicarboxylic acid only from succinic acid.
5. Compositions according to embodiment 4, characterized in that the diols are aliphatic.
6. Compositions according to embodiment 5, characterized in that the diol is butanediol.

7. Compositions according to any of the preceding embodiments, characterized in that k is a whole number from 1 to 8.
8. Compositions according to any of the preceding embodiments, characterized in that k is a whole number from 1 to 5.
9. Compositions according to any of the preceding embodiments, characterized in that the proportion of the trimers (k=1) is from 50 to 98 mol % of the component C.
10. Compositions according to any of the preceding embodiments, characterized in that the proportion of the trimers (k=1) is from 60 to 95 mol % of the component C.
11. Compositions according to any of the preceding embodiments, characterized in that the proportion of the trimers (k=1) is from 65 to 90 mol % of the component C.
12. Compositions according to any of the preceding embodiments, characterized in that the proportion of the trimers (k=1) is from 65 to 85 mol % of the component C.
13. Compositions according to any of the preceding embodiments, characterized in that the proportion of the trimers (k=1) is from 75 to 85 mol % of the component C.
14. Compositions according to any of the preceding embodiments, characterized in that the component C is selected from the group comprising propoxyphosphazenes, phenoxyphosphazenes, methylphenoxyphosphazenes, aminophosphazenes and fluoroalkylphosphazenes.
15. Compositions according to any of the preceding embodiments, characterized in that the weight-average molecular weight Mw of the aromatic polycarbonates and polyestercarbonates is in the range from 15000 to 35000 g/mol determined by GPC (gel permeation chromatography in methylene chloride with polycarbonate standard).
16. Compositions according to any of the preceding embodiments characterized in that the weight-average molecular weight Mw of the aromatic polycarbonates and polyestercarbonates is range from 20000 to 33000 g/mol determined by GPC (gel permeation chromatography in methylene chloride with polycarbonate standard).
17. Compositions according to any of the preceding embodiments, characterized in that the weight-average molecular weight Mw of the aromatic polycarbonates and polyestercarbonates is range from 23000 to 30000 g/mol determined by GPC (gel permeation chromatography in methylene chloride with polycarbonate standard).
18. Compositions according to any of the preceding embodiments, characterized in that the polyester according to component B is polybutylene succinate.
19. Compositions according to any of the preceding embodiments, characterized in that the weight-average molecular weights Mw of component B are between 15 and 750 kg/mol determined by gel permeation chromatography against a polystyrene reference.
20. Compositions according to any of the preceding embodiments, characterized in that the weight-average molecular weights Mw of component B are between 40 and 500 kg/mol determined by gel permeation chromatography against a polystyrene reference.
21. Compositions according to any of the preceding embodiments, characterized in that the weight-average molecular weights Mw of component B are between 80 and 400 kg/mol determined by gel permeation chromatography against a polystyrene reference.
22. Compositions according to any of the preceding embodiments, characterized in that component B has a glass transition temperature of −45° C. to 0° C.
23. Compositions according to any of the preceding embodiments, characterized in that component B has a melting point of 90° C. to 125° C.
24. Compositions according to any of the preceding embodiments, characterized in that component C is a phenoxyphosphazene having a trimer proportion (k=1) of 65 to 85 mol %, a tetramer proportion (k=2) of 10 to 20 mol %, a proportion of higher oligomeric phosphazenes (k=3, 4, 5, 6 and 7) of 5 to 20 mol % and phosphazene oligomers with k>=8 of 0 to 2 mol % based on component C.
25. Compositions according to any of the preceding embodiments, comprising as component F at least one additive selected from the group comprising flame retardant synergists, antidrip agents, lubricants and mold release agents, nucleating agents, stabilizers, antistats, dyes, pigments and fillers and reinforcers.
26. Compositions according to any of the preceding embodiments, characterized in that the acid component of the polyester originates from renewable raw materials.
27. Use of compositions according to any of embodiments 1 to 26 for producing injection-molded or thermoformed molded articles.
28. Molded articles obtainable from compositions according to any of embodiments 1 to 26.

Component A

Aromatic polycarbonates and polyestercarbonates according to component A which are suitable in accordance with the invention are known from the literature or producible by processes known from the literature (for production of aromatic polycarbonates see, for example, Schnell, "Chemistry and Physics of Polycarbonates", Interscience Publishers, 1964, and also DE-AS 1 495 626, DE-A 2 232 877, DE-A 2 703 376, DE-A 2 714 544, DE-A 3 000 610, DE-A 3 832 396; for production of aromatic polyestercarbonates, for example DE-A 3 077 934).

Preferred modes of production of the polycarbonates for use in accordance with the invention, including the polyestercarbonates, are the known interfacial process and the known melt transesterification process (cf. for example WO 2004/063249 A1, WO 2001/05866 A1, WO 2000/105867, U.S. Pat. Nos. 5,340,905, 5,097,002, 5,717,057).

Aromatic polycarbonates and polyestercarbonates are produced, for example, by reacting diphenols with carbonic halides, preferably phosgene, and/or with aromatic dicarbonyl dihalides, preferably benzenedicarbonyl dihalides, by the interfacial process, optionally using chain terminators, for example monophenols, and optionally using trifunctional or more than trifunctional branching agents, for example triphenols or tetraphenols. Another possibility is production by way of a melt polymerization process via reaction of diphenols with, for example, diphenyl carbonate.

Diphenols for the production of the aromatic polycarbonates and/or aromatic polyestercarbonates are preferably those of formula (I)

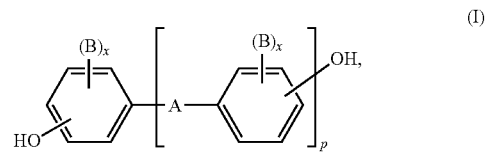

wherein
A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, C$_6$ to C$_{12}$-arylene, onto which further aromatic rings optionally comprising heteroatoms may be condensed, or a radical of formula (II) or (III)

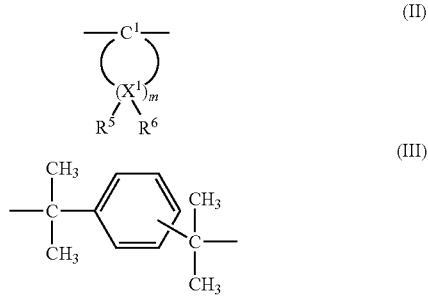

B is in each case C$_1$ to C$_{12}$-alkyl, preferably methyl, halogen, preferably chlorine and/or bromine, x is independently at each occurrence 0, 1 or 2, p is 1 or 0, and R$^5$ and R$^6$ are individually choosable for each X$^1$ and are each independently hydrogen or C$_1$ to C$_6$-alkyl, preferably hydrogen, methyl or ethyl, X$^1$ is carbon and m is a whole number from 4 to 7, preferably 4 or 5, with the proviso that on at least one atom X$^1$, R$^5$ and R$^6$ are simultaneously alkyl.

Preferred diphenols are hydroquinone, resorcinol, dihydroxydiphenols, bis(hydroxyphenyl)-C$_1$-C$_5$-alkanes, bis(hydroxyphenyl)-C$_5$-C$_6$-cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl)diisopropylbenzenes and also ring-brominated and/or ring-chlorinated derivatives thereof.

Particularly preferred diphenols are 4,4'-dihydroxybiphenyl, bisphenol-A, 2,4-bis(4-hydroxyphenyl)-2-methylbutane, 1,1'-bis(4-hydroxyphenyl)cyclohexane, 1,1-bis(4-hydroxyphenyl)-3,3,5-trimethylcyclohexane, 4,4'-dihydroxybiphenyl sulfide, 4,4'-dihydroxybiphenyl sulfone and the di- and tetrabrominated or chlorinated derivatives thereof, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. 2,2-bis(4-hydroxyphenyl)propane (bisphenol A) is especially preferred.

The diphenols may be used individually or in the form of any desired mixtures. The diphenols are known from the literature or obtainable by processes known from the literature.

Examples of suitable chain terminators for the production of the thermoplastic, aromatic polycarbonates are phenol, p-chlorophenol, p-tert-butylphenol and 2,4,6-tribromophenol, and also long-chain alkylphenols, for example 4-[2-(2,4,4-trimethylpentyl)]phenol, 4-(1,3-tetramethylbutyl)phenol according to DE-A 2 842 005 and monoalkylphenols or dialkylphenols having a total of from 8 to 20 carbon atoms in the alkyl substituents, for example 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The amount of chain terminators to be employed is generally between 0.5 mol % and 10 mol % based on the molar sum of the diphenols used in each case.

The thermoplastic aromatic polycarbonates may be branched in a known manner, and preferably through incorporation of 0.05 to 2.0 mol %, based on the sum of the diphenols used, of trifunctional or more than trifunctional compounds, for example those having three or more phenolic groups.

Both homopolycarbonates and copolycarbonates are suitable. Production of inventive copolycarbonates according to component A may also employ 1% to 25% by weight, preferably 2.5% to 25% by weight, based on the total amount of diphenols to be employed, of polydiorganosiloxanes having hydroxyaryloxy end groups. These are known (U.S. Pat. No. 3,419,634) and can be produced by processes known from the literature. The production of copolycarbonates comprising polydiorganosiloxane is described in DE-A 3 334 782.

Preferred polycarbonates are not only bisphenol A homopolycarbonates but also copolycarbonates of bisphenol A comprising up to 15 mol %, based on the molar sums of diphenols, of other diphenols mentioned as preferred or particularly preferred, in particular 2,2-bis(3,5-dibromo-4-hydroxyphenyl)propane.

Aromatic diacyl dihalides for the production of aromatic polyestercarbonates are preferably the diacyl dichlorides of isophthalic acid, of terephthalic acid, of diphenyl ether 4,4'-dicarboxylic acid and of naphthalene-2,6-dicarboxylic acid.

Particular preference is given to mixtures of the diacyl dichlorides of isophthalic acid and of terephthalic acid in a ratio of from 1:20 to 20:1.

Production of polyestercarbonates additionally makes concomitant use of a carbonyl halide, preferably phosgene, as a bifunctional acid derivative.

Chain terminators that can be used for the production of the aromatic polyestercarbonates are not only the abovementioned monophenols but also the chlorocarbonic esters of these, and also the acyl chlorides of aromatic monocarboxylic acids, which can optionally have substitution by C$_1$ to C$_{22}$-alkyl groups or by halogen atoms; aliphatic C$_2$ to C$_{22}$-monoacyl chlorides can also be used as chain terminators here.

The quantity of chain terminators in each case is from 0.1 to 10 mol %, based on moles of diphenol in the case of the phenolic chain terminators and on moles of diacyl dichloride in the case of monoacyl chloride chain terminators.

The aromatic polyestercarbonates may also incorporate aromatic hydroxycarboxylic acids.

The aromatic polyestercarbonates may be either linear or else branched in a known manner; (in this connection see DE-A 2 940 024 and DE-A 3 007 934).

Examples of branching agents that can be used are acyl chlorides having a functionality of three or higher, e.g. trimesoyl trichloride, cyanuroyl trichloride, 3,3',4,4'-benzophenonetetracarbonyl tetrachloride, 1,4,5,8-naphthalenetetracarbonyl tetrachloride or pyromellitoyl tetrachloride, in quantities of from 0.01 to 1.0 mol % (based on diacyl dichlorides used) or tri- or polyfunctional phenols, such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)methane, 1,4-bis[4,4'-dihydroxytriphenyl)methyl]benzene, in quantities of from 0.01 to 1.0 mol %, based on diphenols used.

Phenolic branching agents may be initially charged together with the diphenols; acid chloride branching agents may be introduced together with the acid dichlorides.

The proportion of carbonate structural units in the thermoplastic aromatic polyestercarbonates may be varied as desired. The proportion of carbonate groups is preferably up to 100 mol %, in particular up to 80 mol %, particularly preferably up to 50 mol %, based on the sum of ester groups and carbonate groups. Both the ester fraction and the carbonate fraction of the aromatic polyestercarbonates may be present in the polycondensate in the form of blocks or randomly distributed.

The relative solution viscosity ($\eta_{rel}$) of the aromatic polycarbonates and polyestercarbonates is preferably in the range 1.18 to 1.4, particularly preferably in the range 1.20 to 1.32 (measured on solutions of 0.5 g of polycarbonate or polyestercarbonate in 100 ml of methylene chloride solution at 25° C.). The weight-average molecular weight Mw of the aromatic polycarbonates and polyestercarbonates is preferably in the range from 15 000 to 35 000 g/mol, more preferably in the range from 20 000 to 33 000 g/mol, very preferably 23 000 to 30 000 g/mol, determined by GPC (Gel Permeation Chromatography in methylene chloride with polycarbonate standard).

Component B

As component B) the compositions according to the invention comprise a polyester or a mixture of two or more different polyesters.

Polyesters in the context of the invention are reaction products of succinic acid or reactive derivatives thereof and aliphatic, cycloaliphatic or araliphatic diols, and mixtures of these reaction products.

Preferred polyesters may be produced from succinic acid (or reactive derivatives thereof) or from mixtures of succinic acid and up to 20 mol % of radicals of other aromatic dicarboxylic acids having 8 to 14 C atoms or of aliphatic dicarboxylic acids having 4 to 12 C atoms such as radicals of phthalic acid, isophthalic acid, naphthalene-2,6-dicarboxylic acid, 4,4'-biphenyldicarboxylic acid, adipic acid, sebacic acid, azelaic acid, cyclohexanediacetic acid, cyclohexanedicarboxylic acid and aliphatic diols having 2 to 10 C atoms, for example ethanediol, propylene glycol, butanediol or pentanediol, by known methods such as condensation polymerization of dicarboxylic acid compounds or functional derivatives such as anhydrides or chlorides on the one hand and diols on the other. The condensation polymerization may be carried out in solution, in the melt or in solid phase, or in a combination of reaction steps in different phases.

In a further embodiment the polyester polymer is an aliphatic polyalkylene succinate. In yet a further embodiment the polyester polymer is selected from the group consisting of polyethylene succinate, polyethylene succinate-co-adipate, polyethylene succinate-co-terephthalate, polybutylene succinate, polybutylene succinate-co-adipate and polybutylene succinate-co-terephthalate.

Succinic esters produced solely from succinic acid or reactive derivatives thereof (e.g. dimethyl esters or anhydrides) and a diol are particularly preferred.

In a preferred embodiment diols of the present invention are aliphatic diols. In a further preferred embodiment the diols are alkanediols having 2 to 10 carbon atoms. Diols selected from the group comprising ethanediol, propanediol, butanediol and pentanediol are particularly preferred, butanediol being most preferred. In the most preferred embodiment a polyester of succinic acid and butanediol is used.

In a preferred embodiment coupling agents are employed to increase molecular weight. Examples of such coupling agents are 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate and isophorone diisocyanate. It is preferable to use hexamethylene diisocyanate and isophorone diisocyanate.

The production of the polyesters according to the invention is described in EP 0707047 A2 for example.

The succinic esters may be branched by incorporation of relatively small amounts of 3- or 4-hydric alcohols or 3- or 4-functional carboxylic acid such as are described for example in DE 1900270 A1 and U.S. Pat. No. 3,692,744 (A). Examples of preferred branching agents are trimesic acid, trimellitic acid, trimethylolethane, trimethylolpropane and pentaerythritol. A particularly preferred branching agent is trimethylolpropane, most preferably 1,1,1-trimethylolpropane. It is advisable to use not more than 1 wt % of the branching agent based on the polyester.

The preferably used succinic esters have weight-average molecular weights Mw of 10 to 1500 kg/mol (determined by gel permeation chromatography against a polystyrene reference, solvent dichloromethane, concentration 6 g/l), preferably 15 to 750 kg/mol, yet more preferably 40 to 500 kg/mol and particularly preferably 80 to 400 kg/mol.

Succinic acid used as the acid component may originate from biological sources, i.e. may be obtained from renewable raw materials, by fermentation of glucose or from hydrolyzates of biomass, for example.

In one particularly preferred embodiment, the polyester is a polybutylene succinate having a weight-average molecular weight of 80 to 400 kg/mol (determined by gel permeation chromatography against a polystyrene reference).

During production the corresponding dicarboxylic diester is typically initially formed in an esterification or transesterification reaction at temperatures of about 150° C. to 300° C. and this is then subjected to polycondensation at increasing temperature and reduced pressure, the corresponding hydroxyl compounds and/or water being eliminated. The last stages of the reaction are carried out generally under high vacuum (<10 mm mercury column), in order to prepare a polyester polymer with high molecular weight.

Both reaction steps may optionally be carried out using esterification catalysts and/or transesterification catalysts and/or polycondensation catalysts. Customary catalysts include Ti, Zr, Sn and Sb compounds for the esterification, Mn, Co and Zn compounds for the transesterification, and Sb, Ti, Pb, Ge, Zn and Sn compounds for the polycondensation, the compounds being selected in general from the group encompassing oxides, alkoxides, acetates and carboxylates. The metal content of the catalyst is customarily between 20 and 500 ppm, based on 100 parts by weight of polyester polymer.

Component B preferably has a glass transition temperature of −50° C. to 90° C., particularly preferably −45° C. to 0° C. Component B preferably has a melting point of 80° C. to 260° C., more preferably of 85° C. to 180° C. and yet more preferably of 90° C. to 125° C.

The glass transition temperature is determined according to DIN 53765 at a heating rate of 20 K using nitrogen inert gas, the glass transition temperature being determined as the point of intersection of the middle line between the extrapolated baselines before and after the glass transition of the measurement plot.

Component C

Phosphazenes according to component C employed in accordance with the present invention are cyclic phosphazenes according to formula (IV)

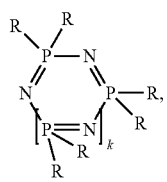

(IV)

wherein
R is in each case identical or different and represents
an amine radical,
in each case optionally halogenated, preferably fluorine-halogenated, more preferably monohalogenated, $C_1$- to $C_8$-alkyl, preferably methyl, ethyl, propyl oder butyl,
$C_1$- to $C_8$-alkoxy, preferably methoxy, ethoxy, propoxy oder butoxy,
in each case optionally alkyl-substituted, preferably $C_1$-$C_4$-alkyl-substituted, and/or halogen-substituted, preferably chlorine- and/or bromine-substituted, $C_5$- to $C_6$-cycloalkyl,
in each case optionally alkyl-substituted, preferably $C_1$-$C_4$-alkyl-substituted, and/or halogen-substituted, preferably chlorine-, bromine- and/or hydroxyl-substituted, $C_6$- to $C_{20}$-aryloxy, preferably phenoxy, naphthyloxy,
in each case optionally alkyl-substituted, preferably $C_1$-$C_4$-alkyl-substituted, and/or halogen-substituted, preferably chlorine- and/or bromine-substituted, $C_7$- to $C_{12}$-aralkyl, preferably phenyl-$C_1$-$C_4$-alkyl or,
a halogen radical, preferably chlorine or fluorine, or
an OH radical,
K is a whole number from 1 to 10, preferably a number from 1 to 8, particularly preferably 1 to 5.

It is preferable when in addition to the trimer (k=1) further higher oligomers with k=2 to 10 are present.

It is more preferable to employ as component C phosphazenes having a trimer proportion (k=1) of 50 to 98 mol %, more preferably of 60 to 95 mol %, particularly preferably of 65 to 90 mol % and very particularly preferably of 65-85 mol %, in particular 70-85 mol %, based on component C.

Preference is given to:
propoxyphosphazene, phenoxyphosphazene, methylphenoxyphosphazene, aminophosphazene and fluoroalkylphosphazenes, and also phosphazenes having the following structures:

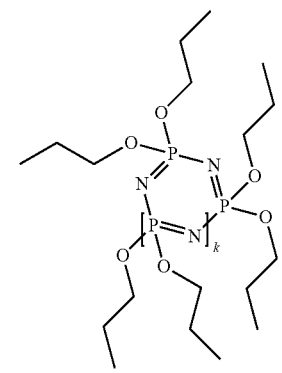

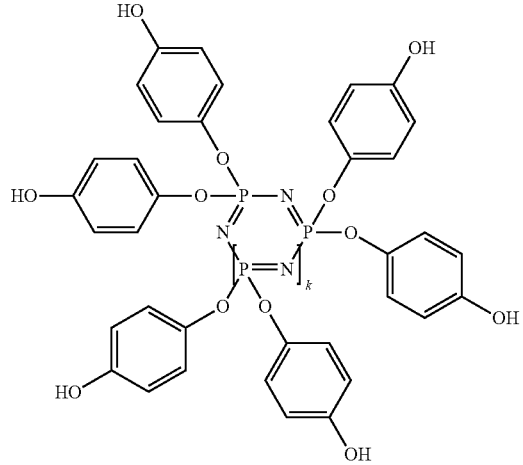

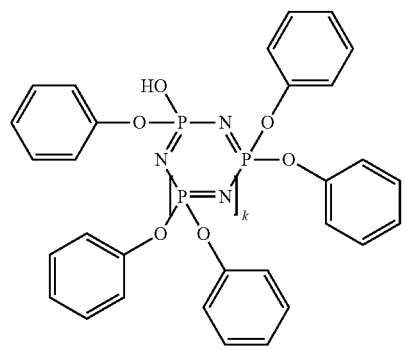

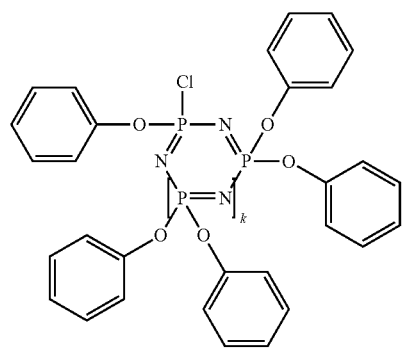

-continued

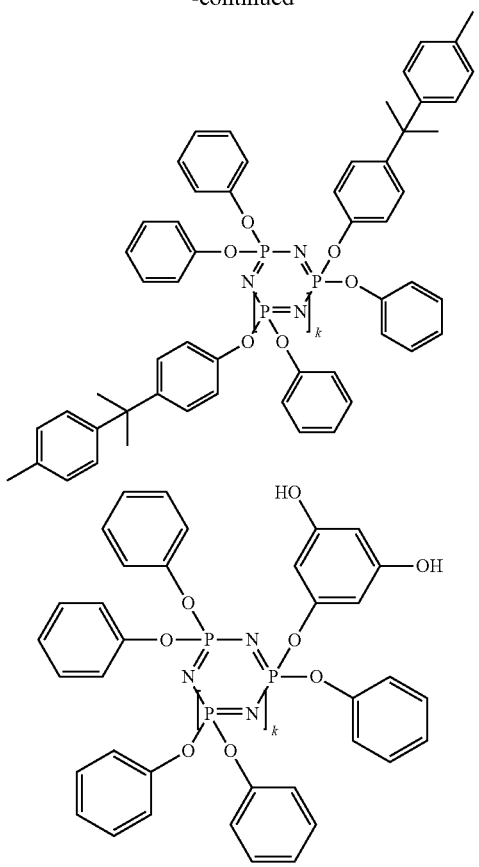

In the compounds shown above k=1, 2 or 3.

Phenoxyphosphazene (all R=phenoxy) having a proportion of oligomers where k=1 (C1) of 50 to 98 mol %, more preferably 60 to 98 mol %, is preferred.

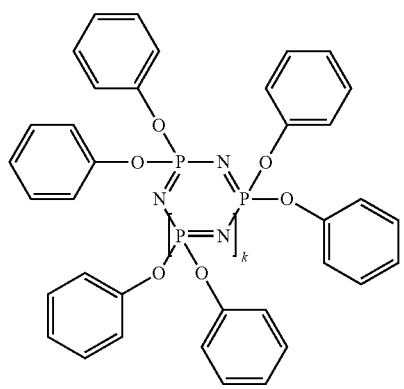

(V)

In the case where the phosphazene according to formula (IV) is halogen-substituted at the phosphorus, for example from incompletely reacted starting material, the proportion of this phosphazene halogen-substituted at the phosphorus is preferably less than 1000 ppm, more preferably less than 500 ppm.

The phosphazenes may be employed alone or as a mixture, i.e. the radical R may be identical or 2 or more radicals in formula (IV) may be different. The radicals R of a phosphazene are preferably identical.

In a further preferred embodiment only phosphazenes having identical R are employed. In a preferred embodiment the proportion of the tetramers (k=2) (C2) is from 2 to 50 mol % based on component C, more preferably from 5 to 40 mol %, yet more preferably from 10 to 30 mol %, particularly preferably from 10 to 20 mol %.

In a preferred embodiment the proportion of the higher oligomeric phosphazenes (k=3, 4, 5, 6 and 7) (C3) is from 0 to 30 mol % based on component C, more preferably from 2.5 to 25 mol %, yet more preferably from 5 to 20 mol % and particularly preferably from 6-15 mol %.

In a preferred embodiment the proportion of the oligomers having k>=8 (C4) is from 0 to 2.0 mol % based on component C and preferably from 0.10 to 1.00 mol %.

In a further preferred embodiment the phosphazenes of component C fulfill all three abovementioned conditions in terms of the proportions (C2-C4).

Component C is preferably a phenoxyphosphazene having a trimer proportion (k=1) of 65 to 85 mol %, a tetramer proportion (k=2) of 10 to 20 mol %, a proportion of higher oligomeric phosphazenes (k=3, 4, 5, 6 and 7) of 5 to 20 mol % and phosphazene oligomers with k>=8 of 0 to 2 mol % based on component C.

n defines the weighted arithmetic average of k according to the following formula:

$$n = \frac{\sum_{i=1}^{max} k_i \cdot x_i}{\sum_{i=1}^{max} x_i}$$

$x_i$ is the proportion of the oligomer $k_i$ and the sum of all $x_i$ is thus equal to 1.

In an alternative embodiment n is in the range from 1.10 to 1.75, preferably from 1.15 to 1.50, more preferably from 1.20 to 1.45 and particularly preferably from 1.20 to 1.40 (range boundaries included).

Phosphazenes and the production thereof are described in EP-A 728 811, DE-A 1 2407668 and WO 97/40092 for example.

The oligomer compositions of the phosphazenes in the respective blend samples may be detected and quantified by $^{31}P$ NMR even after compounding (chemical shift; δ trimer: 6.5 to 10.0 ppm; δ tetramer: −10 to −13.5 ppm; δ higher oligomers: −16.5 to −25.0 ppm).

Component D

Component D comprises one or more graft polymers of

| | |
|---|---|
| D.1 | 5 to 95, preferably 30 to 90, wt % of at least one vinyl monomer on |
| D.2 | 95 to 5, preferably 70 to 10, wt % of at least one graft substrate selected from the group consisting of diene rubbers, EP(D)M rubbers (i.e. those based on ethylene/propylene and optionally diene), acrylate rubbers, polyurethane rubbers, silicone rubbers, silicone acrylate rubbers, chloroprene and ethylene/vinyl acetate rubbers, and also polybutadiene-styrene rubber. |

The graft substrate D.2 generally has a median particle size ($d_{50}$ value) of 0.05 to 10 μm, preferably 0.1 to 5 μm, particularly preferably 0.2 to 1 μm.

Monomers D.1 are preferably mixtures of

| | |
|---|---|
| D.1.1 | 50 to 99 parts by weight of vinylaromatics and/or ring-substituted vinylaromatics (such as styrene, α-methylstyrene, p-methylstyrene, p-chlorostyrene) and/or ($C_1$-$C_8$)-alkyl (meth)acrylates, such as methyl (meth)acrylate, ethyl (meth)acrylate, and |
| D.1.2 | 1 to 50 parts by weight of vinyl cyanides (unsaturated nitriles, such as acrylonitrile and methacrylonitrile) and/or ($C_1$-$C_8$)-alkyl (meth)acrylates, such as methyl methacrylate, n-butyl acrylate, tert-butyl acrylate, and/or derivatives (such as anhydrides and imides) of unsaturated carboxylic acids, for example maleic anhydride and N-phenylmaleimide. |

Preferred monomers D.1.1 are selected from at least one of the monomers styrene, α-methylstyrene and methyl methacrylate; preferred monomers D.1.2 are selected from at least one of the monomers acrylonitrile, maleic anhydride and methyl methacrylate.

The characterization of the constituent "(meth)" in parentheses for acrylates denotes the optional presence of this constituent.

Preferred graft substrates D.2 are silicone acrylate rubbers, diene rubbers (for example those based on butadiene and isoprene) or mixtures of diene rubbers. In the context of the invention "diene rubber" is to be understood as also including copolymers of diene rubbers or mixtures thereof with further copolymerizable monomers (e.g. as per D.1.1 and D.1.2).

The graft substrates D.2 generally have a glass transition temperature of <10° C., preferably <0° C., particularly preferably <−10° C.

In one embodiment the monomer D.1 is polymethyl methacrylate (PMMA), wherein more preferably the graft substrate D.2 is a silicone acrylate rubber.

Particularly preferred polymers D are for example ABS polymers (emulsion, bulk and suspension ABS) as are described for example in DE-OS 2 035 390 (=US-PS 3 644 574) or in DE-OS 2 248 242 (=GB-PS 1 409 275) or in Ullmann's, Enzyklopädie der Technischen Chemie, Vol. 19 (1980), p. 280 et seq.

The gel content of the graft substrate D.2 is preferably at least 20 wt % and in the case of graft substrates D.2 produced in emulsion polymerization preferably at least 40 wt % (measured in toluene).

It is preferable when the graft polymer composed of components D.1 and D.2 has a core-shell structure, wherein component D.1 forms the shell and component D.2 forms the core (see by way of example Ullmann's Encyclopedia of Industrial Chemistry, VCH-Verlag, Vol. A21, 1992, page 635 and page 656).

The graft copolymers D are produced by free-radical polymerization, for example by emulsion, suspension, solution or bulk polymerization, preferably by emulsion or bulk polymerization.

Particularly suitable graft rubbers also include ABS polymers produced in an emulsion polymerization process by redox initiation with an initiator system of organic hydroperoxide and ascorbic acid according to U.S. Pat. No. 4,937,285.

Since, as is well known, the graft monomers are not necessarily entirely grafted onto the graft substrate in the grafting reaction, in accordance with the invention graft polymers D are also understood to include products generated by (co)polymerization of the graft monomers in the presence of the graft substrate and coobtained in the workup.

Suitable acrylate rubbers according to D.2 of the polymers D are preferably polymers of alkyl acrylates, if appropriate with up to 40% by weight, based on D.2, of other polymerizable, ethylenically unsaturated monomers. Among the preferred polymerizable acrylates are $C_1$ to $C_8$-alkyl esters, for example methyl, ethyl, butyl, n-octyl and 2-ethylhexyl esters; haloalkyl esters, preferably halo-$C_1$-$C_8$-alkyl esters, such as chloroethyl acrylate, and also mixtures of these monomers.

Monomers having more than one polymerizable double bond can be copolymerized for crosslinking purposes. Preferred examples of crosslinking monomers are esters of unsaturated monocarboxylic acids having from 3 to 8 carbon atoms and of unsaturated monohydric alcohols having from 3 to 12 carbon atoms, or of saturated polyols having from 2 to 4 OH groups and from 2 to 20 carbon atoms, e.g. ethylene glycol dimethacrylate, allyl methacrylate; polyunsaturated heterocyclic compounds, e.g. trivinyl and triallyl cyanurate; polyfunctional vinyl compounds, such as di- and trivinylbenzenes; and also triallyl phosphate and diallyl phthalate. Preferred crosslinking monomers are allyl methacrylate, ethylene glycol dimethacrylate, diallyl phthalate and heterocyclic compounds which have at least three ethylenically unsaturated groups. Particularly preferred crosslinking monomers are the cyclic monomers triallyl cyanurate, triallyl isocyanurate, triacryloylhexahydro-s-triazine, triallylbenzenes. The quantity of the crosslinked monomers is preferably from 0.02 to 5% by weight, in particular from 0.05 to 2% by weight based on the graft base D.2. The quantity of cyclic crosslinking monomers having at least three ethylenically unsaturated groups is advantageously restricted to less than 1% by weight of the graft base D.2.

Examples of preferred "other" polymerizable ethylenically unsaturated monomers which in addition to the acrylates may optionally be used for production of the graft substrate D.2 are for example acrylonitrile, styrene, α-methylstyrene, acrylamides, vinyl $C_1$-$C_8$-alkyl ethers, methyl methacrylate, butadiene. Preferred acrylate rubbers for use as graft substrate D.2 are emulsion polymers having a gel content of at least 60 wt %.

Suitable silicone rubbers according to D.2 may be prepared by emulsion polymerization, as described, for example, in U.S. Pat. Nos. 2,891,920 and 3,294,725. Other suitable graft substrates according to D.2 are silicone rubbers having grafting-active sites, such as are described in DE-OS 3 704 657, DE-OS 3 704 655, DE-OS 3 631 540 and DE-OS 3 631 539.

Also suitable as graft substrates D.2 according to the invention are silicone acrylate rubbers. These silicone acrylate rubbers are composite rubbers having grafting-active sites comprising 10-90 wt % of silicone rubber fraction and 90 to 10 wt % of polyalkyl (meth)acrylate rubber fraction, the two recited rubber components interpenetrating one another in the composite rubber so that they are essentially inseparable from one another. If the content of the silicone rubber component in the composite rubber is too high, the finished resin compositions have disadvantageous surface properties and are less easy to color. If, on the other hand, the fraction of the polyalkyl (meth)acrylate rubber component in the composite rubber is too high, the impact toughness of the finished resin composition will be adversely affected. Silicone acrylate rubbers are known and described in U.S. Pat. No. 5,807,914, EP 430134 and U.S. Pat. No. 4,888,388 for example. It is preferable to use a graft polymer produced by emulsion polymerization where D.1 is methyl methacrylate and D.2 is silicone acrylate composite rubber.

The gel content of the graft substrate D.2 is determined at 25° C. in a suitable solvent (M. Hoffmann, H. Krömer, R. Kuhn, Polymeranalytik I and II, Georg Thieme-Verlag, Stuttgart 1977).

The median particle size $d_{50}$ is the diameter with 50 wt % of the particles above it and 50 wt % below it. It can be determined by ultracentrifuge measurement (W. Scholtan, H. Lange, Kolloid, Z. and Z. Polymere 250 (1972), 782-1796).

Component E

Component E comprises one or more thermoplastic vinyl (co)polymers and/or polyalkylene terephthalates.

Suitable vinyl (co)polymers E are polymers of at least one monomer from the group of vinylaromatics, vinyl cyanides (unsaturated nitriles), ($C_1$-$C_8$)-alkyl (meth)acrylates, unsaturated carboxylic acids and also derivatives (such as anhydrides and imides) of unsaturated carboxylic acids. Especially suitable are (co)polymers of E.1 50 to 99, preferably 60 to 80, parts by weight of vinylaromatics and/or ring-substituted vinylaromatics such as styrene, α-methylstyrene, p-methylstyrene, p-chlorostyrene, and/or ($C_1$-$C_8$)-alkyl (meth)acrylates, such as methyl methacrylate, ethyl methacrylate, and E.2 1 to 50, preferably 20 to 40, parts by weight of vinyl cyanides (unsaturated nitriles) such as acrylonitrile and methacrylonitrile and/or ($C_1$-$C_8$)-alkyl (meth)acrylates, such as methyl methacrylate, n-butyl acrylate, tert-butyl acrylate, and/or unsaturated carboxylic acids, such as maleic acid, and/or derivatives, such as anhydrides and imides, of unsaturated carboxylic acids, examples being maleic anhydride and N-phenylmaleimide.

The vinyl (co)polymers E are resinous, thermoplastic and rubber-free. The copolymer of E.1 styrene and E.2 acrylonitrile is particularly preferred.

The (co)polymers according to E are known and can be prepared by free-radical polymerization, in particular by emulsion, suspension, solution or bulk polymerization. The (co)polymers preferably have average molecular weights Mw (weight average, determined by light scattering or sedimentation) between 15 000 and 200 000 g/mol.

Suitable as component E the compositions comprise in accordance with the invention a polyalkylene terephthalate or a mixture of two or more different polyalkylene terephthalates.

Polyalkylene terephthalates in the context of the invention are polyalkylene terephthalates deriving from terephthalic acid (or reactive derivatives thereof, e.g. dimethyl esters or anhydrides) and alkanediols, cycloaliphatic or araliphatic diols and mixtures thereof, based for example on propylene glycol, butanediol, pentanediol, hexanediol, 1,2-cyclohexanediol, 1,4-cyclohexanediol, 1,3-cyclohexanediol, and cyclohexyldimethanol, wherein the diol component according to the invention has more than 2 carbon atoms. Accordingly preferred for use as component E are polybutylene terephthalate and/or polytrimethylene terephthalate, most preferably polybutylene terephthalate.

The polyalkylene terephthalates according to the invention may as a monomer of the diacid also comprise up to 5 wt % of isophthalic acid.

Preferred polyalkylene terephthalates may be produced from terephthalic acid (or reactive derivatives thereof) and aliphatic or cycloaliphatic diols having 3 to 21 C atoms by known methods (Kunststoff-Handbuch, vol. VIII, p. 695 ff., Carl-Hanser-Verlag, Munich 1973).

Preferred polyalkylene terephthalates comprise at least 80, preferably at least 90, mol %, based on the diol component, of propane-1,3-diol and/or butane-1,4-diol radicals.

The preferred polyalkylene terephthalates may contain, as well as terephthalic acid radicals, up to 20 mol % of radicals of other aromatic dicarboxylic acids having 8 to 14 carbon atoms or of aliphatic dicarboxylic acids having 4 to 12 carbon atoms, such as radicals of phthalic acid, isophthalic acid, naphthalene-2,6-dicarboxylic acid, 4,4'-biphenyldicarboxylic acid, succinic acid, adipic acid, sebacic acid, azelaic acid, cyclohexanediacetic acid, cyclohexanedicarboxylic acid.

The preferred polyalkylene terephthalates may contain, as well as propane-1,3-diol and/or butane-1,4-diol radicals, up to 20 mol % of other aliphatic diols having 3 to 12 C atoms or cycloaliphatic diols having 6 to 21 C atoms, for example radicals of propane-1,3-diol, 2-ethylpropane-1,3-diol, neopentyl glycol, pentane-1,5-diol, hexane-1,6-diol, cyclohexane-1,4-dimethanol, 3-methylpentane-2,4-diol, 2-methylpentane-2,4-diol, 2,2,4-trimethylpentane-1,3-diol and 2-ethylhexane-1,6-diol, 2,2-diethylpropane-1,3-diol, hexane-2,5-diol, 1,4-di(β-hydroxyethoxy)benzene, 2,2-bis (4-hydroxycyclohexyl)propane, 2,4-dihydroxy-1,1,3,3-tetramethylcyclobutane, 2,2-bis(3-β-hydroxyethoxyphenyl) propane and 2,2-bis(4-hydroxypropoxyphenyl)propane (DE-A 24 07 674, 24 07 776, 27 15 932).

The polyalkylene terephthalates may be branched by incorporation of relatively small amounts of 3- or 4-hydric alcohols or 3- or 4-basic carboxylic acid, such as are described in DE-A 19 00 270 and U.S. Pat. No. 3,692,744 for example. Examples of preferred branching agents are trimesic acid, trimellitic acid, trimethylolethane and trimethylolpropane, and pentaerythritol.

It is advisable to use not more than 1 mol % of the branching agent, based on the acid component.

Particular preference is given to polyalkylene terephthalates which have been produced solely from terephthalic acid or reactive derivatives thereof (e.g. dialkyl esters thereof such as dimethyl terephthalate) and propane-1,3-diol and/or butane-1,4-diol (polypropylene terephthalate and polybutylene terephthalate) and mixtures of these polyalkylene terephthalates.

Preferred polyalkylene terephthalates also include copolyesters produced from at least two of the abovementioned acid components and/or from at least two of the abovementioned alcohol components; particularly preferred copolyesters are poly(propylene-1,3-glycol/butane-1,4-diol) terephthalates.

The polyalkylene terephthalates generally have an intrinsic viscosity of about 0.4 to 1.5 dl/g, preferably 0.5 to 1.3 dl/g, measured in each case in phenol/o-dichlorobenzene (1:1 parts by weight) at 25° C.

In an alternative embodiment, the polyesters produced in accordance with the invention may also be used in admixture with other polyesters and/or further polymers, preference being given here to using mixtures of polyalkylene terephthalates with other polyesters.

Component F

The composition may comprise further commercially available additives according to component F such as flame retardant synergists, anti-dripping agents (for example compounds from the classes of the fluorinated polyolefins or the silicones and also aramid fibers), lubricants and mold release agents (for example pentaerythritol tetrastearate), nucleation agents, stabilizers, antistats (for example conductive carbon blacks, carbon fibers, carbon nanotubes and also organic antistats such as polyalkylene ethers, alkylsulfonates or polyamide-containing polymers), fillers and reinforcers (for example glass fibers or carbon fibers, mica, kaolin, talc, $CaCO_3$ and glass flakes) and also dyes and pigments.

Particularly preferably employed as additives are mold release agents, stabilizers and also dyes and pigments, wherein carbon fibers and carbon nanotubes do not constitute dyes and pigments in the context of the present invention and are preferably not present in the compositions.

Production and Testing of the Molding Materials

The thermoplastic molding materials of the invention are produced when the respective constituents are mixed and melt compounded and melt extruded at temperatures of generally 240° C. to 300° C. in customary assemblies such as internal kneaders, extruders and twin-shaft screw systems in known fashion.

The mixing of the individual constituents may be effected in known fashion, either successively or simultaneously, either at about 20° C. (room temperature) or at a higher temperature.

The invention likewise provides processes for producing the molding materials, provides for use of the molding materials to produce molded articles and provides the moldings themselves.

The molding materials according to the invention may be used for producing molded articles of any kind. These can be produced by injection molding, extrusion and blow molding processes. A further form of processing is the production of molded articles by thermoforming from previously produced sheets or films.

Examples of such molded articles are films, profiles, all kinds of housing parts, for example for domestic appliances such as television sets, juice presses, coffee machines, mixers; for office equipment such as monitors, flatscreens, notebooks, printers, copiers; sheets, tubes, electrical installation ducts, windows, doors and further profiles for the construction sector (interior fitout and exterior applications), and also electrical and electronic parts such as switches, plugs and sockets and also bodywork and interior components for commercial vehicles, especially for the automotive sector.

In addition, the molding materials according to the invention may for example also be used to produce the following molded articles or moldings: interior fitout components for rail vehicles, ships, aircraft, buses and other motor vehicles, housings for electrical appliances containing small-scale transformers, housings for information processing and transmission devices, housings and casings of medical devices, massage devices and housings therefor, children's toy vehicles, sheetlike wall elements, housings for safety devices and for television sets, thermally insulated transport containers, molded parts for sanitary and bathroom equipment, cover grids for blower vents and housings for garden appliances.

The following examples serve to more particularly elucidate the invention.

Production and Testing of the Molding Materials

In a twin-screw extruder (Werner and Pfleiderer ZSK-25), the feedstocks listed in Table 1 are compounded and pelletized at a speed of 225 rpm and a throughput of 20 kg/h at a machine temperature of 260° C.

The finished pellet materials are processed in an injection molding machine to afford appropriate specimens (melt temperature 240° C., mold temperature 80° C., flow front speed 240 mm/s).

Elongation at break was measured to DIN EN ISO 527 on bars having dimensions of 170.0×10.0×4.0 mm. Stress cracking behavior (ESC behavior) was investigated on rods having dimensions of 80×10×4 mm, processing temperature 260° C. Rapeseed oil was used as the test medium. The test specimens were pre-elongated using a circular arc template (pre-elongation in percent) and stored in the test medium at room temperature. The stress cracking behavior was evaluated as the time until crack formation/fracture in the test medium.

Component A-1

Linear polycarbonate based on bisphenol A having a relative solution viscosity of $\eta_{rel}=1.28$, measured in $CH_2Cl_2$ as solvent at 25° C. and a concentration of 0.5 g/100 ml.

Component A-2

Linear polycarbonate based on bisphenol A having a relative solution viscosity of $\eta_{rel}=1.19$, measured in $CH_2Cl_2$ as solvent at 25° C. and a concentration of 0.5 g/100 ml.

Component B

Linear polyester of 48 wt % succinic acid, 51 wt % 1,4-butanediol and 1.0 wt % hexamethylene diisocyanate having a weight-average molecular weight Mw of 255 kg/mol (determined by GPC against a polystyrene reference, solvent dichloromethane, concentration 6 g/l).

Component C-1

Phenoxyphosphazene of formula (a) comprising 70 wt % k=1 and 30 wt % k=2-10.

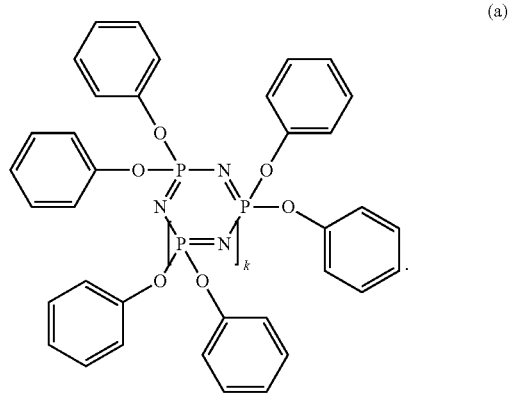

(a)

Component C-2 (Comparison)

Bisphenol-A-based oligophosphate having a phosphorus content of 8.9%.

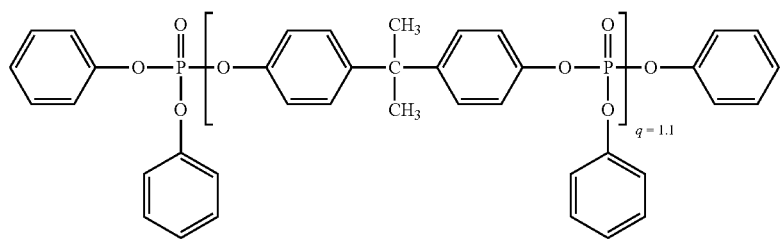

Component F-1
CFP 6000 N, polytetrafluoroethylene powder (producer: Du Pont, Geneva, Switzerland)
Component F-2
Pentaerythritol tetrastearate as lubricant/mold release agent
Component F-3
Phosphite stabilizer, Irganox® B 900, Ciba Specialty Chemicals It is apparent from table 1 that the compositions of examples 1 to 3 comprising phosphazene as flame retardants solve the problem of the invention, i.e. have a combination of high elongation at break and good chemicals resistance.

TABLE 1

Composition and properties of the molding compositions

| | Ex. 1 | Ex. 2 | Ex. 3 | Ex. 4 | Comp. 1 | Comp. 2 | Comp. 3 | Comp. 4 |
|---|---|---|---|---|---|---|---|---|
| Components (parts by weight) | | | | | | | | |
| A-1 | 52.1 | 46.1 | 40.1 | 34.1 | 52.1 | 46.1 | 40.0 | 34.1 |
| A-2 | 30.0 | 26.0 | 22.0 | 18.0 | 30.0 | 26.0 | 22.0 | 18.0 |
| B | 10.0 | 20.0 | 30.0 | 40.0 | 10.0 | 20.0 | 30.0 | 40.0 |
| C-1 | 7.0 | 7.0 | 7.0 | 7.0 | | | | |
| C-2 | | | | | 7.0 | 7.0 | 7.0 | 7.0 |
| F-1 | 0.4 | 0.4 | 0.4 | 0.4 | 0.4 | 0.4 | 0.4 | 0.4 |
| F-2 | 0.4 | 0.4 | 0.4 | 0.4 | 0.4 | 0.4 | 0.4 | 0.4 |
| F-3 | 0.1 | 0.1 | 0.1 | 0.1 | 0.1 | 0.1 | 0.1 | 0.1 |
| Properties | | | | | | | | |
| Elongation at break | 121 | 124 | 115 | 112 | 92 | 59 | 76 | 79 |
| ESC-Test (rapeseed oil), 2.4%, time until fracture [min] | 82 | 58 | 90 | 1200 | 50 | 50 | 30 | 140 |

The invention claimed is:

1. A composition comprising
A) at least one polymer selected from the group consisting of aromatic polycarbonate and aromatic polyestercarbonate,
B) at least one polyester, wherein the polyester is derived from succinic acid and butanediol,
C) at least one cyclic phosphazene of structure (IV)

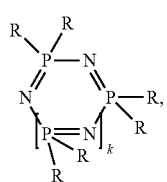

(IV)

wherein
R is in each case identical or different and represents an amine radical,
in each case optionally halogenated $C_1$- to $C_8$-alkyl, $C_1$- to $C_8$-alkoxy
in each case optionally alkyl- and/or halogen-substituted $C_5$- to $C_6$-cycloalkyl,
in each case optionally alkyl- and/or halogen- and/or hydroxyl-substituted $C_6$- to $C_{20}$-aryloxy,
in each case optionally alkyl- and/or halogen- and/or bromine-substituted $C_7$- to $C_{12}$-aralkyl,
a halogen radical or
an OH radical,
k is a whole number from 1 to 10,
D) optionally graft polymer,
E) optionally vinyl (co)polymer and/or polyalkylene terephthalate, and
F) optionally additives.

2. The composition as claimed in claim 1, wherein the proportions of the components are as follows
A) 40 to 98 parts by weight,
B) 1 to 60 parts by weight,
C) 1 to 20 parts by weight,
D) 0 to 20 parts by weight,
E) 0 to 20 parts by weight,
F) 0 to 30 parts by weight,
and wherein the sum of the parts by weight of the composition is normalized to 100.

3. The composition as claimed in claim 1, wherein the proportions of the components are as follows
A) 50 to 85 parts by weight,
B) 5 to 45 parts by weight,
C) 3 to 12 parts by weight,
D) 0 to 10 parts by weight,
E) 0 to 10 parts by weight,
F) 0.2 to 10 parts by weight,
and wherein the sum of the parts by weight of the composition is normalized to 100.

4. The composition as claimed in claim 1, wherein k is a whole number from 1 to 5.

5. The composition as claimed in claim 1, wherein the proportion of the trimers (k=1) is from 50 to 98 mol % of the component C.

6. The composition as claimed in claim 1, wherein the proportion of the trimers (k=1) is from 70 to 85 mol % of the component C.

7. The composition as claimed in claim 1, wherein the component C is selected from the group consisting of propoxyphosphazenes, phenoxyphosphazenes, methylphenoxyphosphazenes, aminophosphazenes and fluoroalkylphosphazenes.

8. The composition as claimed in claim 1, wherein the weight-average molecular weights Mw of component B are between 40 and 500 kg/mol, determined by gel permeation chromatography against a polystyrene reference.

9. The composition as claimed in claim 1, wherein component F is at least one additive selected from the group consisting of flame retardant synergists, anti-dripping agents, lubricants and mold release agents, nucleating agents, stabilizers, antistats, dyes, pigments, fillers and reinforcing agents.

10. The composition as claimed in claim 1, wherein the acid component of the polyester originates from renewable raw materials.

11. A process for producing injection-molded or thermoformed molded articles which comprises utilizing the composition as claimed in claim 1.

12. A molded article obtainable from the composition as claimed in claim 1.

13. A composition consisting of
   A) 50 to 85 parts by weight of at least one polymer selected from the group consisting of aromatic polycarbonate and aromatic polyestercarbonate,
   B) 5 to 45 parts by weight of at least one polyester, wherein the polyester is derived from succinic acid and butanediol, and optionally contains a coupling agent,
   C) 3 to 12 parts by weight of a compound selected from the group consisting of propoxyphosphazenes, phenoxyphosphazenes, methylphenoxyphosphazenes, aminophosphazenes and fluoroalkylphosphazenes,
   D) 0 to 10 parts by weight of graft polymer,
   E) 0 to 10 parts by weight of vinyl (co)polymer and/or polyalkylene terephthalate, and
   F) 0.2 to 10 parts by weight of additives.

14. The composition of claim 13, wherein component C is phenoxyphosphazene having a trimer proportion (k=1) of 65 to 85 mol %, a tetramer proportion (k=2) of 10 to 20 mol %, a proportion of higher oligomeric phosphazenes (k=3, 4, 5, 6 and 7) of 5 to 20 mol % and phosphazene oligomers with k>=8 of 0 to 2 mol % based on component C.

15. The composition of claim 14, wherein the molecular weight of component B is between 80 and 400 kg/mol.

16. The composition of claim 13, wherein the composition is free from vinyl (co)polymers and polyalkylene terephthalates.

17. The composition of claim 14, wherein the coupling agent is hexamethylene diisocyanate os isophorone diisocyanate.

* * * * *